(12) United States Patent
Noguchi et al.

(10) Patent No.: US 7,934,422 B2
(45) Date of Patent: May 3, 2011

(54) ANGULAR VELOCITY SENSOR AND ANGULAR VELOCITY SENSING DEVICE

(75) Inventors: Takao Noguchi, Tokyo (JP); Kenichi Tochi, Tokyo (JP); Ken Unno, Tokyo (JP); Tatsuo Namikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 864 days.

(21) Appl. No.: 12/078,051

(22) Filed: Mar. 26, 2008

(65) Prior Publication Data

US 2009/0165554 A1    Jul. 2, 2009

(30) Foreign Application Priority Data

Mar. 30, 2007    (JP) ................. 2007-091270

(51) Int. Cl.
*G01P 9/04*    (2006.01)
(52) U.S. Cl. .................................. 73/504.15
(58) Field of Classification Search ............... 73/504.12, 73/504.15, 504.16
See application file for complete search history.

(56) References Cited

U.S. PATENT DOCUMENTS
7,246,520 B2 *    7/2007    Eguchi et al. ............. 73/504.16

FOREIGN PATENT DOCUMENTS

| JP | A-08-128833 | 5/1996 |
|---|---|---|
| JP | A-2003-227719 | 8/2003 |
| JP | A-2004-333460 | 11/2004 |
| JP | A-2005-106481 | 4/2005 |
| JP | B2-3694160 | 7/2005 |
| JP | B2-3734955 | 10/2005 |

* cited by examiner

*Primary Examiner* — John E Chapman
(74) *Attorney, Agent, or Firm* — Oliff & Berridge, PLC

(57) ABSTRACT

Provided is a horizontally located sensitive angular velocity sensor capable of easily eliminating influence of acceleration in a lateral direction and whose fixed section is easily fixed. The angular velocity sensor includes a pair of fixed sections fixed on a top of an sensor support section of a case, a detection arm extending along a plane parallel to the sensor support section, and a pair of upper drive arm and lower drive arm extending along the plane parallel to the sensor support section and extending in a direction opposite to each other so as to intersect an extending direction of the detection arm.

15 Claims, 16 Drawing Sheets

US 7,934,422 B2

ANGULAR VELOCITY SENSOR AND ANGULAR VELOCITY SENSING DEVICE

CROSS REFERENCES TO RELATED APPLICATIONS

The present invention contains subject matter related to Japanese Patent Application JP 2007-091270 filed in the Japanese Patent Office on Mar. 30, 2007, the entire contents of which being incorporated herein by reference.

BACKGROUND OF THE INVENTION

1. Field of the Invention

The present invention relates to an angular velocity sensor detecting an angular velocity of an object and an angular velocity sensing device provided with such an angular velocity sensor.

2. Description of the Related Art

Angular velocity sensors have been used in technique autonomously controlling postures of ships, airplanes, rockets and the like. Recently, the angular velocity sensors have been equipped on small electronic devices such as car navigation systems, digital cameras, video cameras, cell-phones and the like. With that trend, miniaturization and low profile (thinning) of the angular velocity sensors are further demanded. Instead of a vertically located angular velocity sensor (for example, refer to Japanese Unexamined Patent Publication No. 2003-227719) of the related art where its longitudinal direction (detection axis direction) is parallel to a vertical direction, a horizontally located angular velocity sensor (for example, refer to Japanese Unexamined Patent Publication No. Hei-8-128833, Japanese Unexamined Patent Publication No. 2004-333460, and Japanese Patent No. 3694160) where its longitudinal direction is orthogonal to the vertical direction has been proposed.

SUMMARY OF THE INVENTION

However, in Japanese Unexamined Patent Publication No. Hei-8-128833, Japanese Unexamined Patent Publication No. 2004-333460, and Japanese Patent No. 3694160, when the angular velocity sensor receives acceleration in a lateral direction (a direction orthogonal to the longitudinal direction in a horizontal plane), it is difficult to distinguish whether vibrations of a detection arm are generated due to the angular velocity by rotation of the object, or due to the acceleration in the lateral direction.

Also, in Japanese Unexamined Patent Publication No. 2005-106481 and Japanese Patent No. 3734955, a pair of detection arms are provided on both sides of a fixed section or on both sides of a drive arm, and this enables elimination of acceleration component received in the lateral direction. However, in Japanese Unexamined Patent Publication No. 2005-106481, the drive arm and the detection arm are coupled with the fixed section in between so that a complicated mechanism is necessarily provided in the fixed section so as to efficiently transmit a distortion generated by Coriolis force, to the detection arm through the fixed section. Thus, the fixed section is not easily fixed. On the other hand, in Japanese Patent No. 3734955, because the drive arm and the detection arm are directly coupled without the fixed section in between, although the complicated mechanism is not provided in the fixed section, the distortion generated by the Coriolis force can be efficiently transmitted to the detection arm. However, because respective both ends of the drive arm and the detection arm are fixed to the fixed section, the drive arm and the detection arm are hardly vibrated and there is a possibility that sensitivity of a sensor is reduced.

In view of the foregoing, it is desirable to provide a horizontally located angular velocity sensor capable of easily eliminating an influence of acceleration in the lateral direction and whose fixed section is easily fixed, and an angular velocity sensing device provided with such an angular velocity sensor An angular velocity sensor of an embodiment of the present invention includes a pair of first fixed sections fixed on a first support surface, a first vibration arm extending along a plane parallel to the first support surface, and a pair of second vibration arms extending along the plane parallel to the first support surface and extending in a direction opposite to each other so as to intersect an extending direction of the first vibration arm. Here, one end of the first vibration arm is coupled to one of the pair of first fixed sections, and the other end of the first vibration arm is coupled to the other of the pair of first fixed sections. Also, one end of each of the second vibration arms is coupled to the first vibration arm, and the other end of each of the second vibration arms is formed as a free end. The expression "coupled" is a concept including the case where both parts are mechanically bonded, the case where the both parts are integrally formed, and the case where the both parts are directly or indirectly coupled.

The angular velocity sensing device of an embodiment of the present invention includes an angular velocity sensor and an integrated circuit, where the integrated circuit transmits a drive signal to vibrate the second vibration arms, and receives a detection signal outputted by the vibration of the first vibration arm.

In the angular velocity sensor and the angular velocity sensing device of an embodiment of the present invention, the first vibration arm and the pair of second vibration arms are coupled without the first fixed section in between; thereby distortion generated by Coriolis force acting on the pair of second vibration arms is directly transmitted to the first vibration arm without the fixed section in between. One end of each of the second vibration arms is coupled to the first vibration arm, and extends in the direction opposite to each other so as to intersect the extending direction of the first vibration arm. This means that the first vibration extends in an opposite direction with respect to the pair of second vibration arms. Therefore, in the first vibration arm, the vibrations generated due to the Coriolis force and the vibrations generated by the acceleration in the lateral direction are easily distinguished. Also, because the other end of each of the second vibration arms is formed as a free end, the first vibration arm and the pair of second vibration arms are easily vibrated in comparison with the case where all ends of the first vibration arm and the pair of second vibration arms are fixed.

Here, one end of each of the second vibration arms can be coupled to middle point of the extending length of the first vibration arm. Also, the second vibration arms can be arranged so as to extend symmetrically with respect to the first vibration arm. Each of the second vibration arms, whose one end is coupled to a common portion of the first vibration arm, can be formed extending on a straight line which passes through the common portion and can be formed extending orthogonal to the first vibration arm. The other end of each of the second vibration arms can be coupled to a weighting section.

Two types of electrodes can be provided in the following way. (1) Two pairs of first electrodes are formed on the first vibration arm at positions adjacent to a coupling point with the coupling point in between, the coupling point being a node where the second vibration arms are coupled to the first vibration arm, and each pair of the first electrodes is arranged in a width direction orthogonal to the extending direction of the first vibration arm. (2) A pair of second electrodes are formed on each of the second vibration arms, and are arranged in a width direction orthogonal to the extending direction of the second vibration arms.

Further, a pair of third vibration arms can be provided in the following way. The pair of third vibration arms extend along the plane parallel to the first support surface, and extend in the direction opposite to each other so as to intersect an extending direction of the first vibration arm. Also, one end of each of the pair of third vibration arms is coupled to the first vibration arm, and the other end of each of the pair of third vibration arms is formed as a free end.

In the case that the pair of third vibration arms are provided, the following (1) to (6) are possible.

(1) When a length in the extending direction of the first vibration arm is divided into quarters, each of the second vibration arms is coupled to the first vibration in a position one-fourths from one of the pair of fixed sections, and each of the third vibration arms is coupled to the first vibration arm in the position three-fourths from the one of the pair of fixed sections. (2) The second vibration arms and the third vibration arms are arranged so as to extend symmetrically with respect to the first vibration arm, respectively. (3) Each of the second vibration arms, whose one end is coupled to a common portion of the first vibration arm, extends on a straight line which passes through the common portion and extends orthogonal to the first vibration arm. Each of the third vibration arms, whose one end is coupled to a common portion of the first vibration arm, extends on a straight line which passes through the common portion and extends orthogonal to the first vibration arm. (4) One end of each of the second vibration arms is coupled to a weighting section and one end of each of the third vibration arms is coupled to a weighting section. (5) Four types of electrodes are provided in the following way. Two pairs of first electrodes are formed on the first vibration arm at positions adjacent to a coupling point with the coupling point in between, the coupling point being a node where the second vibration arms are coupled to the first vibration arm, and each pair of the first electrodes are arranged in a width direction orthogonal to the extending direction of the first vibration arm. A pair of second electrodes are formed on each of the second vibration arms, and are arranged in a width direction orthogonal to the extending direction of the second vibration arms. Two pairs of third electrodes are formed on the first vibration arm at positions adjacent to a coupling point with the coupling point in between, the coupling point being a node where the third vibration arms are coupled to the first vibration arm, and each pair of the third electrodes are arranged in a width direction orthogonal to the extending direction of the first vibration arm. A pair of fourth electrodes are formed on each of the third vibration arms, and are arranged in a width direction orthogonal to the extending direction of the third vibration arms. (6) A second fixed section fixed on a second support surface is provided, and the middle point of the extending length of the first vibration arm is coupled to the second fixed section.

According to the angular velocity sensor and the angular velocity sensing device of an embodiment of the present invention, the first vibration arm and the pair of second vibration arms are coupled without the first fixed section in between; thereby the distortion generated by the Coriolis force acting on the pair of second vibration arms can be efficiently transmitted to the first vibration arm without complicating the configuration of the fixed section. Thus, the fixed section is easily fixed on the support surface. One end of each of the second vibration arms is coupled to the first vibration arm, and extends in the direction opposite to each other so as to intersect the extending direction of the first vibration arm; thereby although the angular velocity sensor is horizontally located, the vibrations generated due to the Coriolis force and the vibrations generated by the acceleration in the lateral direction are easily distinguished in the first vibration arm. Thus, influence of the acceleration in the lateral direction is easily eliminated. Because the other end of each of the second vibration arms is formed as a free end, the first vibration arm and the pair of the second vibration arms are easily vibrated; thereby the sensitivity of the sensor can be enhanced.

Here, in the case that each of the second vibration arms is coupled to the middle point of the extending length of the first vibration arm, it means that each of the second vibration arms is coupled to an anti-node of the vibration (standing wave) generated in the first vibration arm due to the Coriolis force; thereby the distortion generated by the Coriolis force can be efficiently transmitted to the first vibration arm. Therefore, amplitude of the first vibration arm is increased and the sensitivity of the sensor can be enhanced.

In the case that each of the second vibration arms is arranged so as to extend symmetrically with respect to the first vibration arm, the vibrations by the acceleration in the lateral direction and the vibrations by the angular velocity are easily distinguished; thereby the detection accuracy of the angular velocity is improved.

In the case that each of the second vibration arms is coupled to the common portion of the first vibration arm, and formed extending on a straight line passing through the common portion and orthogonal to the first vibration arm, right-left symmetric drive vibrations are likely generated; thereby a drive circuit driving each of the second vibration arms can be simplified, and unnecessary vibrations of the first vibration arm can be suppressed.

In the case that one end of each of the second vibration arms is coupled to the weighting section, when each of the second vibration arms is vibrated, the second vibration arms can be vibrated with relatively large amplitude; thereby the detection accuracy of the angular velocity is improved.

Further, in the case that the pair of third vibration arms are provided, when a length in the extending direction of the first vibration arm is divided into quarters, each of the second vibration arms is coupled to the first vibration in the position one-fourths from one of the pair of fixed sections, and each of the third vibration arms is coupled to the first vibration arm in the position three-fourths from the one of the fixed sections. At this time, it means that each of the second vibration arms and each of the third vibration arms are respectively coupled to anti-nodes of the vibration (standing wave) generated in the first vibration arm due to the Coriolis force; thereby the distortion generated by the Coriolis force can be efficiently transmitted to the first vibration arm. Therefore, the amplitude of the first vibration arm is increased and the sensitivity of the sensor can be enhanced.

In the case that each of the second vibration arms and each of the third vibration arms are formed extending line-symmetrically with respect to the first vibration arm, the vibrations by the acceleration in the lateral direction and the vibrations by the angular velocity are easily distinguished; thereby the detection accuracy of the angular velocity is improved.

In the case that each of the second vibration arms is coupled to one of the common portions of the first vibration arm and formed extending on a straight line passing through the one of the common portions and orthogonal to the first vibration arm, and each of the third vibration arms is coupled to the other of the common portions of the first vibration arm and extending on a straight line passing through the other of the common portions and orthogonal to the first vibration arm, right-left symmetric drive vibrations are likely generated; thereby the drive circuit driving each of the second vibration arms can be simplified, and unnecessary vibrations of the first vibration arm can be suppressed.

In the case that one end of each of the second vibration arms is coupled to the weighting section and one end of each of the third vibration arms is coupled to the weighting section, when each of the second vibration arms and each of the third vibration arms are vibrated, the second vibration arms and the third vibration arms can be vibrated with relatively large amplitude; thereby the detection accuracy of the angular velocity is improved.

In the case that the second fixed section fixed on the second support surface is provided, and the middle point of the extending length of the first vibration arm is coupled to the second fixed section, it means that the second fixed section is coupled to a node of the vibration (standing wave) generated in the first vibration arm due to the Coriolis force; thereby unnecessary vibrations of the first vibration arm are suppressed without disturbing the vibrations generated in the first vibration arm due to the Coriolis force.

Other and further objects, features and advantages of the invention will appear more fully from the following description.

DETAILED DESCRIPTION OF THE PREFERRED EMBODIMENTS

Hereinafter, preferred embodiments of the present invention will be described in detail with reference to the accompanying drawings.

First Embodiment

Figure 1:
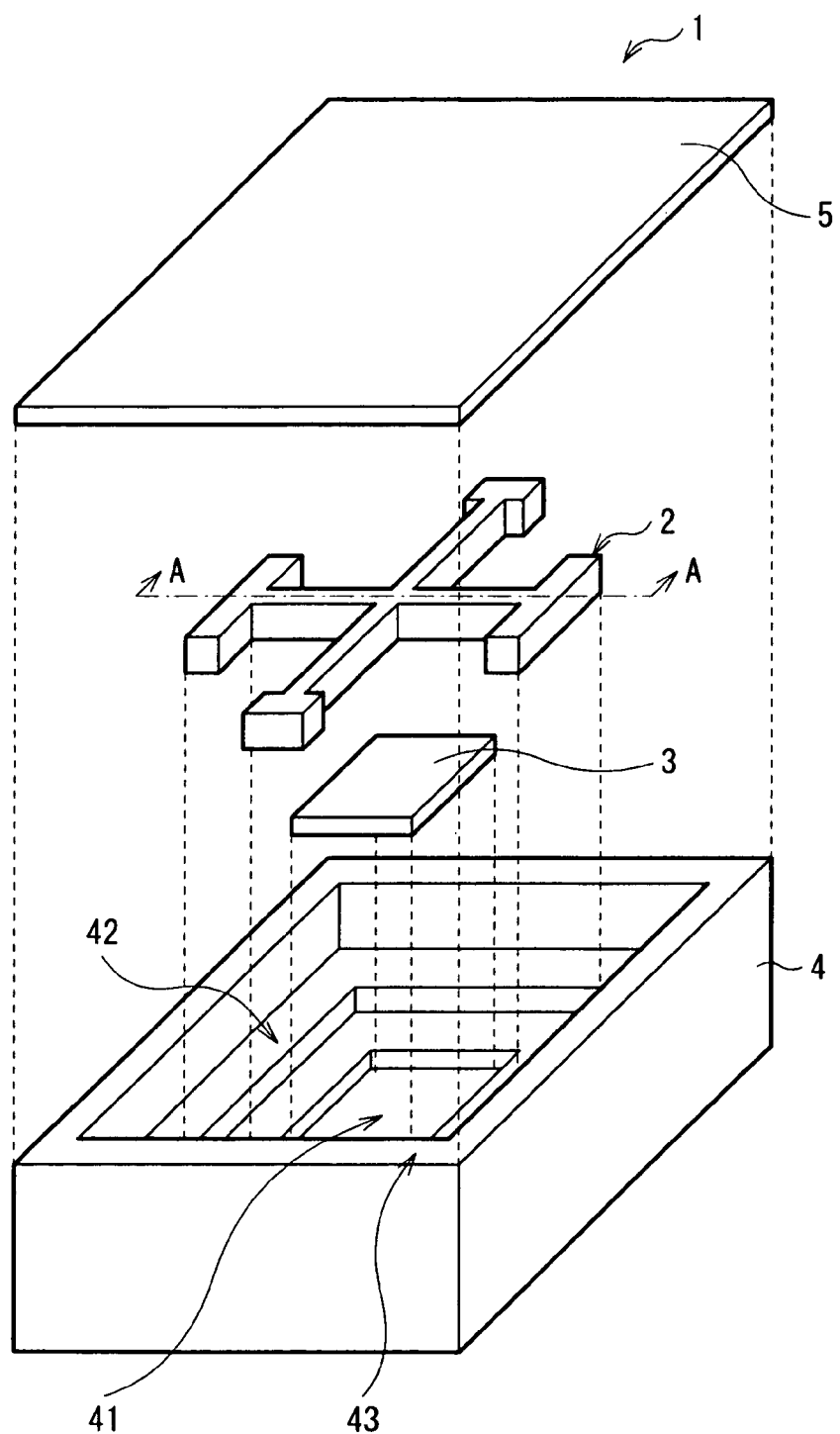
FIG. 1 is an exploded perspective view of an angular velocity sensing device according to a first embodiment of the present invention.
Figure 2:
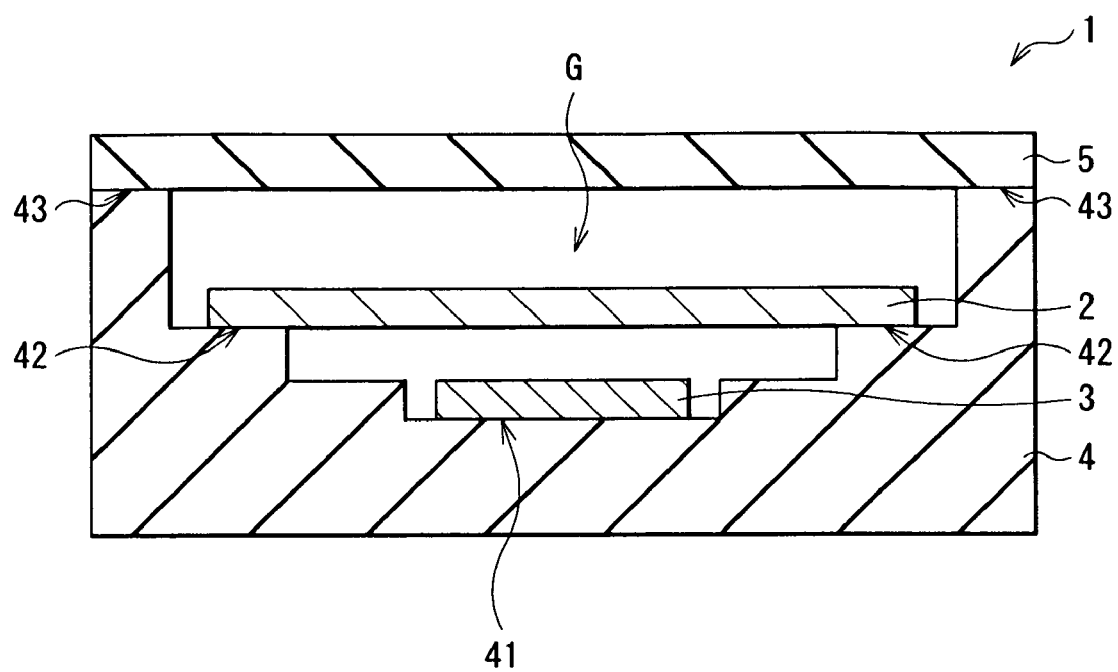
FIG. 2 is a cross-sectional configuration view as viewed from a direction of arrow A-A of FIG. 1.

A configuration of an angular velocity sensing device 1 according to a first embodiment of the present invention will be described in the following. FIG. 1 is an exploded perspective view showing an internal configuration of the angular velocity sensing device 1 according to the first embodiment. FIG. 2 is a cross-sectional view showing a cross-sectional configuration as viewed from arrow A-A of the angular velocity sensing device 1.

The angular velocity sensing device 1 includes an angular velocity sensor 2 and an integrated circuit 3 in an internal space G (refer to FIG. 2) formed by a case 4 and an upper cover section 5 stacked with each other.

As will be described later, the integrated circuit 3 transmits a drive signal to each of piezoelectric elements provided on each of drive arms of the angular velocity sensor 2, and receives a detection signal outputted from each of the piezoelectric elements provided on each of detection arms of the angular velocity sensor 2. The case 4 is, for example, formed by stacking a plurality of ceramic thin plates, and has stepped depressions capable of storing the angular velocity sensor 2 and the integrated circuit 3. The upper cover section 5 is, for example, formed by ceramic materials similar to those of the case 4.

As illustrated in FIG. 1, a rectangular integrated circuit support section 41 is formed in the deepest position of the depressions of the case 4, and the integrated circuit 3 is disposed on the integrated circuit support section 41. A rectangular sensor support section 42 (a first support surface) is formed in the vicinity of the integrated circuit support section 41 and in a position shallower than the position of the integrated circuit support section 41, and the angular velocity sensor 2 is disposed on the sensor support section 42, so as to form a beam structure. A rectangular upper cover support section 43 forming an outer edge of the depression is formed in the vicinity of the angular velocity sensor 2. The upper cover support section 43 and the upper cover section 5 seal up the depression of the case 4 from the exterior, and are stacked with each other to form the internal space G (refer to FIG. 2).

As shown in FIGS. 1 and 2, the angular velocity sensor 2 is formed along an in-plane parallel to a plane including the sensor support section 42 of the case 4. That is, the angular velocity sensor 2 is a so-called horizontally located element.

Figure 3:
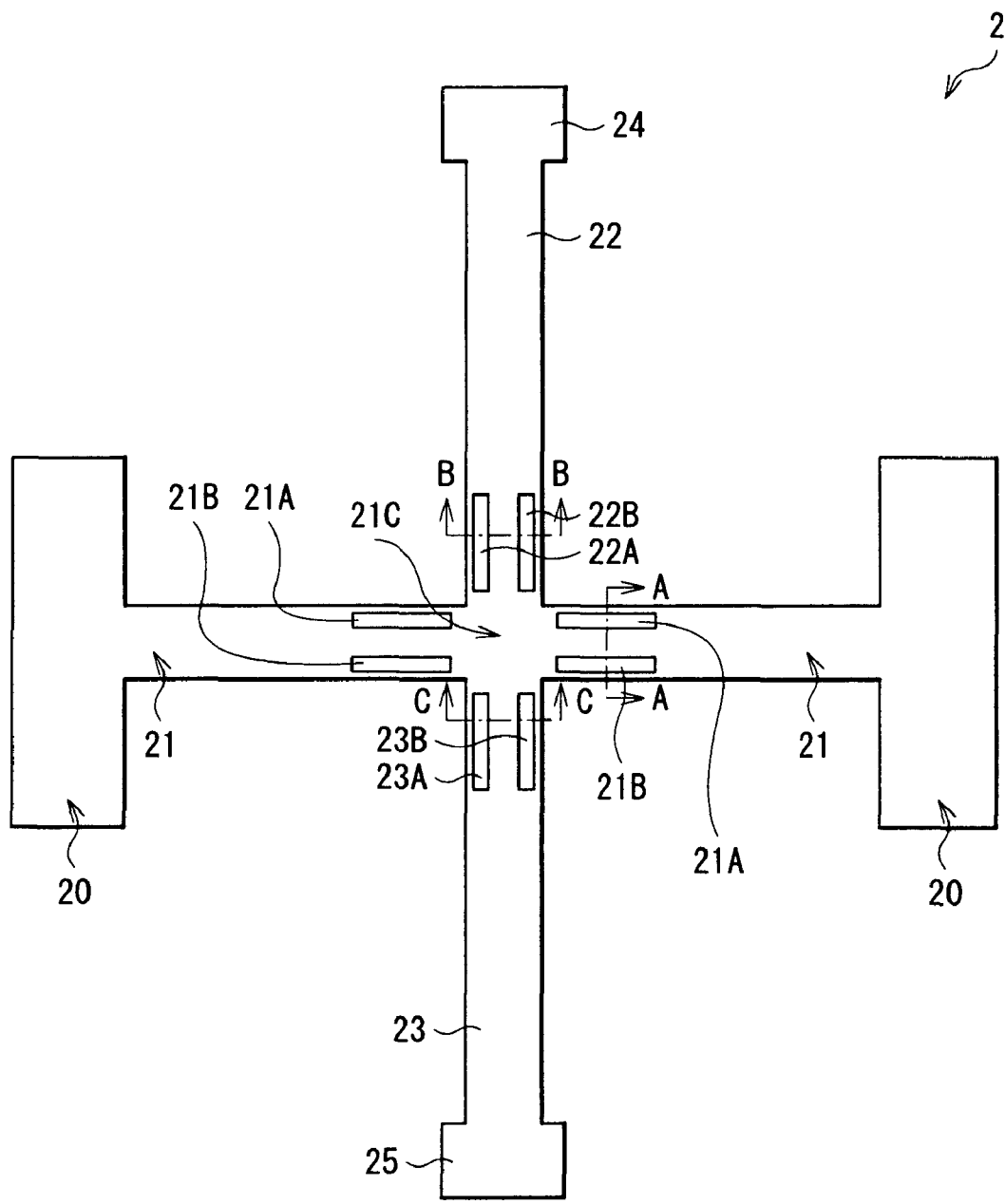
FIG. 3 is a top configuration view of the angular velocity sensor of FIG. 1.
Figure 4:
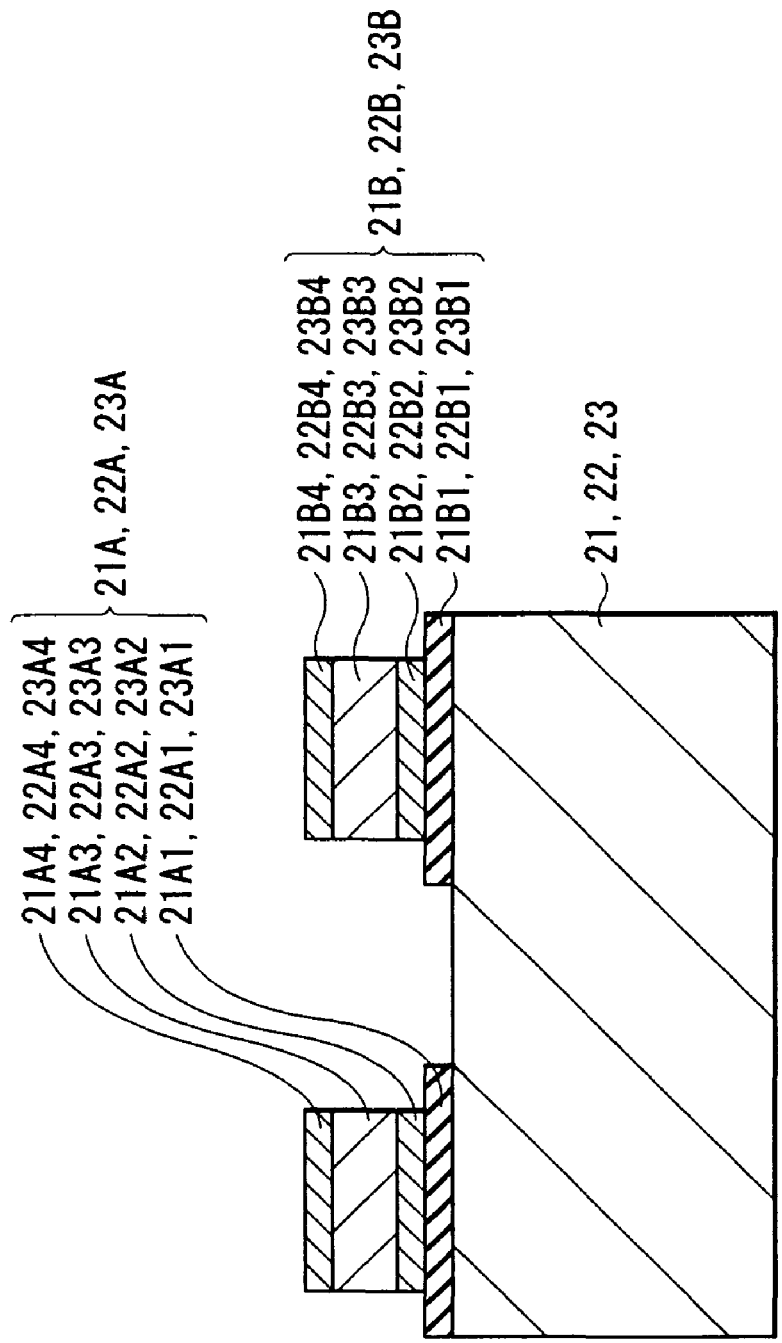
FIG. 4 is a cross-sectional configuration view as viewed from arrows B-B, C-C and D-D of the angular velocity sensor of FIG. 3.

FIG. 3 is a plan view showing an example of a top configuration of the angular velocity sensor 2, and FIG. 4 is a cross-sectional view showing an example where the cross-sectional configurations as viewed from a direction of arrows B-B, C-C, and D-D of FIG. 3 are brought together. The angular velocity sensor 2 includes a pair of fixed sections 20 fixed on the sensor support section 42, a detection arm 21 (a first vibration arm) whose both ends are respectively coupled to the pair of fixed sections 20, and a pair of upper drive arm 22 and lower drive arms 23 (a pair of second vibration arms)

where one end of the upper drive arm 22 and one end of the lower drive arm 23 are respectively coupled to the detection arm 21.

Here, the expression "upper" in "the upper drive arm 22" is used for convenience sake to line-symmetrically indicate an upper side of the drawing surface of FIG. 3 with respect to the detection arm 21, and thus does not indicate a height direction. The expression "lower" in "the lower drive arm 23" is used for convenience sake to line-symmetrically indicate a lower side of the drawing surface of FIG. 3 with respect to the detection arm 21, and thus does not indicate the height direction.

Hereinafter, the expressions "right-left symmetry" "up-down symmetry" and "double symmetry" are used for convenience sake to respectively indicate symmetry in a right-left direction, an up-down direction, and a right-left and up-down direction of the drawing surface. Here, the "right-left" indicates the extending direction of the detection arm 21, and the "up-down" indicates the direction orthogonal to the extending direction of the detection arm 21. The "right-left symmetry" indicates a line-symmetry with respect to a straight line passing through a middle point 21C in the extending direction of the detection arm 21 and orthogonal to the extending direction of the detection arm 21. The "up-down symmetry" indicates a line-symmetry with respect to the detection arm 21. The "double symmetry" indicates symmetry in both the right-left direction and the up-down direction at the same time.

The fixed sections 20 maintain the detection arm 21, and the upper drive arm 22 and the lower drive arm 23 in midair of the internal space G. Each of the fixed sections 20 has, for example, a rectangle shape extending in the direction orthogonal to the extending direction of the detection arm 21. A middle point of each of the fixed sections 20 is coupled to each end of the detection arm 21. The bottom of each of the fixed sections 20 is in contact with the top of the sensor support section 42 of the case 4. The shape and dimension of the fixed sections 20 are not limited as shown in FIG. 3. Any shapes and dimensions are possible as long as the detection arm 21, and the upper drive arm 22 and the lower drive arm 23 can be maintained in midair of the internal space G.

When a distortion generated by the Coriolis force acting on the pair of upper drive arm 22 and lower drive arm 23 is transmitted to the detection arm 21, the detection arm 21 generates vibrations according to magnitude of the distortion. One end of the detection arm 21 is coupled to a side face of one of the pair of fixed sections 20, and the other end of the detection arm 21 is coupled to a side face of the other of the pair of fixed sections 20. That is, by the pair of fixed sections 20, the detection arm 21 is disposed in the space G in the doubly-supported beam structure, and both ends of the detection arm 21 are fixed ends. Therefore, when the distortion generated by the Coriolis force is transmitted to the detection arm 21, for example, the detection arm 21 generates vibrations (standing wave) in the up-down direction, with the middle point 21C of the extending direction of the detection arm 21 as an anti-node and both ends of the detection arm 21 as nodes.

When an object equipped with the angular velocity sensing device 1 performs the rotation with respect to the direction (the vertical direction of the drawing surface in FIG. 3) orthogonal to the plane including the sensor support section 42, the upper drive arm 22 and the lower drive arm 23 generate the Coriolis force thereon. The upper drive arm 22 and the lower drive arm 23 extend in directions opposite to each other so as to intersect the extending direction of the detection arm 21. One end of the upper drive arm 22 and one end of the lower drive arm 23 are coupled to the detection arm 21, and the other end of the upper drive arm 22 and the other end of the lower drive arm 23 are free ends. Therefore, the upper drive arm 22 and the lower drive arm 23 can vibrate the free ends thereof in the right-left direction.

For example as shown in FIG. 3, the upper drive arm 22 and the lower drive arm 23 are preferably coupled to the middle point 21C in the extending direction of the detection arm 21; however, the upper drive arm 22 and the lower drive arm 23 may be coupled to other portions. The upper drive arm 22 and the lower drive arm 23 preferably extend line-symmetrically (up-down symmetrically) with respect to the detection arm 21; however, the upper drive arm 22 and the lower drive arm 23 may be up-down asymmetric. The upper drive arm 22 and the lower drive arm 23 are preferably coupled to the common portion (the middle point 21C in FIG. 3) of the detection arm 21, and extend on a straight line passing through the common portion and orthogonal to the detection arm 21; however, the upper drive arm 22 and the lower drive arm 23 may be coupled to the positions slightly different to each other.

As shown in FIG. 3, one end on the free end side of the upper drive arm 22 may be coupled to a weighting section 24, and one end on the free end side of the lower drive arm 23 may be coupled to a weighting section 25. The weighting sections 24 and 25 adjust the frequency and the amplitude of the drive vibrations of the upper drive arm 22 and the lower drive arm 23. As the weighting sections 24 and 25 are weighted, the frequency is decreased and the amplitude is increased.

Here, the fixed section 20, the detection arm 21, and the upper drive arm 22 and the lower drive arm 23 can be, for example, composed of common materials (for example, silicon) and collectively formed by patterning wafer.

On the surface of the detection arm 21, two pairs of piezoelectric elements 21A and 21B extending in the direction parallel to the extending direction of the detection arm 21 are formed. When the detection arm 21 vibrates along the plane parallel to the plane including the sensor support section 42 of the case 4, the pair of piezoelectric elements 21A and 21B detect the vibrations, and are preferably arranged in the direction intersecting the extending direction of the detection arm 21. The piezoelectric elements 21A and 21B are preferably arranged in the position where the detection arm 21 is most largely distorted. For example, as shown in FIG. 3, the two pairs of piezoelectric elements 21A and 21B are preferably formed in the positions sandwiching the coupling point (the middle point 21C) of the detection arm 21, and the upper drive arm 22 and the lower drive arm 23 from the extending direction of the detection arm 21, respectively.

On the surface of the upper drive arm 22, a pair of piezoelectric elements 22A and 22B extending in the direction parallel to the extending direction of the upper drive arm 22 are formed. The pair of piezoelectric elements 22A and 22B vibrate the upper drive arm 22 along the plane parallel to the plane including the sensor support section 42 of the case 4, and are preferably arranged in the direction intersecting the extending direction of the upper drive arm 22. The piezoelectric elements 22A and 22B are preferably arranged in the position where the upper drive arm 22 is most largely distorted. For example, as shown in FIG. 3, the piezoelectric elements 22A and 22B are preferably formed in the vicinity of the coupling point (the middle point 21C) of the detection arm 21, and the upper drive arm 22 and the lower drive arm 23.

On the surface of the lower drive arm 23, a pair of piezoelectric elements 23A and 23B extending in the direction parallel to the extending direction of the lower drive arm 23 are formed. Similarly to the abovementioned piezoelectric elements 22A and 22B, the pair of piezoelectric elements 23A and 23B vibrate the lower drive arm 23 along the plane parallel to the plane including the sensor support section 42 of the case 4, and are preferably arranged in the direction intersecting the extending direction of the lower drive arm 23. The piezoelectric elements 23A and 23B are preferably arranged in the position where the lower drive arm 23 is most largely distorted. For example, as shown in FIG. 3, the piezoelectric elements 23A and 23B are preferably formed in the vicinity of the coupling point (the middle point 21C) of the detection arm 21, and the upper drive arm 22 and the lower drive arm 23.

Here, for example as shown in FIG. 4, each of the piezoelectric elements 21A, 22A, and 23A are formed by stacking insulation layers 21A1, 22A1, and 23A1, lower electrodes 21A2, 22A2, and 23A2, piezoelectric bodies 21A3, 22A3, and 23A3, and upper electrodes 21A4, 22A4, and 23A4 in this order on the detection arm 21, the upper drive arm 22 or the lower drive arm 23. On the other hand, for example as shown in FIG. 4, each of the piezoelectric elements 21B, 22B, and 23B is formed by stacking insulation layers 21B1, 22B1, or 23B1, lower electrodes 21B2, 22B2, or 23B2, piezoelectric bodies 21B3, 22B3, or 23B3, and upper electrodes 21B4, 22B4, or 23B4 in this order on the detection arm 21, the upper drive arm 22, or the lower drive arm 23. That is, each of the piezoelectric elements 21A, 22A, and 23A and each of the piezoelectric elements 21B, 22B, and 23B are separately formed to each other.

Figure 5:
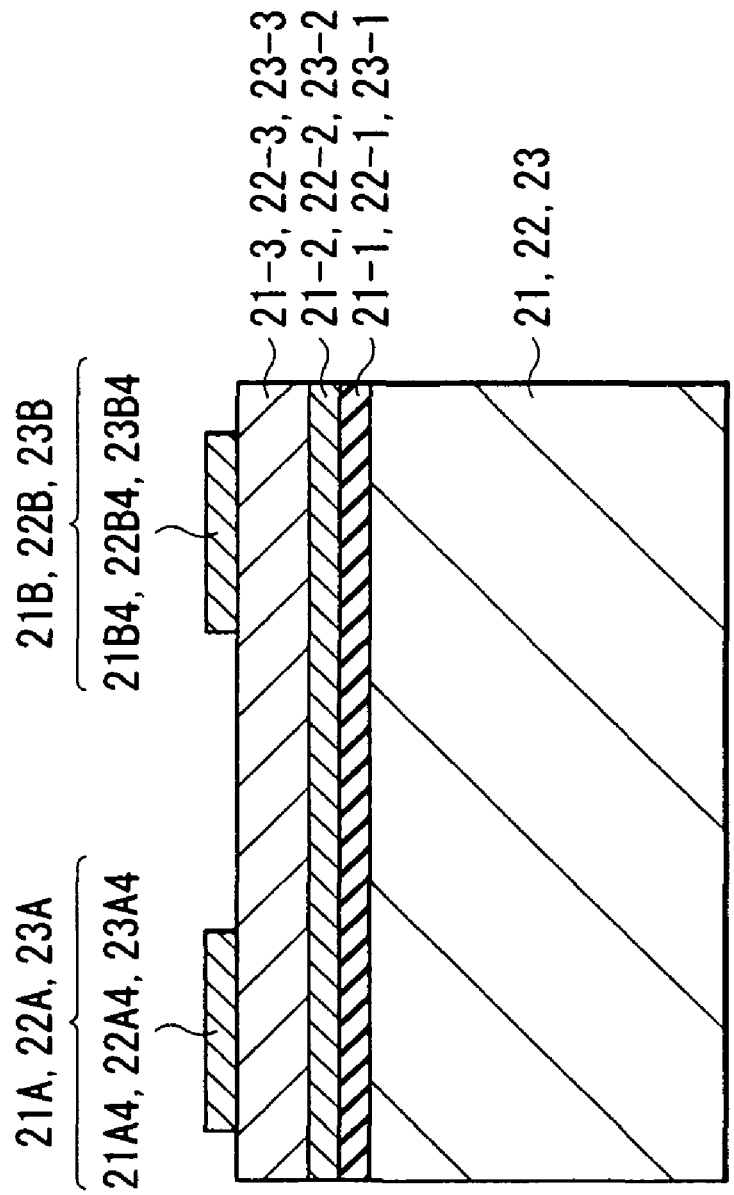
FIG. 5 is a top configuration view of the angular velocity sensor according to a modification of FIG. 3.

For example as shown in FIG. 5, the insulation layers 21A1, 22A1, and 23A1, and the insulation layers 21B1, 22B1, and 23B1 may be formed by common insulation layers 21-1, 22-1, and 23-1. The lower electrodes 21A2, 22A2, and 23A2, and the lower electrodes 21B2, 22B2, and 23B2 may be formed by common lower electrodes 21-2, 22-2, and 23-2. The piezoelectric bodies 21A3, 22A3, and 23A3 and the piezoelectric bodies 21B3, 22B3, and 23B3 may be formed by common piezoelectric bodies 21-3, 22-3, and 23-3.

Here, the insulation layers 21A1, 22A1, 23A1, 21B1, 22B1, 23B1, 21-1, 22-1, and 23-1 are, for example, formed by stacking a $ZrO_2$ film and an $Y_2O_3$ film in this order. The lower electrodes 21A2, 22A2, 23A2 21B2, 22B2, 23B2, 21-2, 22-2, and 23-2 are, for example, composed of a Pt (100) oriented film. The piezoelectric bodies 21A3, 22A3, 23A3, 21B3, 22B3, 23B3, 21-3, 22-3, and 23-3 are, for example, formed including lead zirconium titanate (PZT). The upper electrodes 21A4, 22A4, 23A4, 21B4, 22B4, and 23B4 are, for example, composed of a Pt (100) oriented film.

Figure 6:
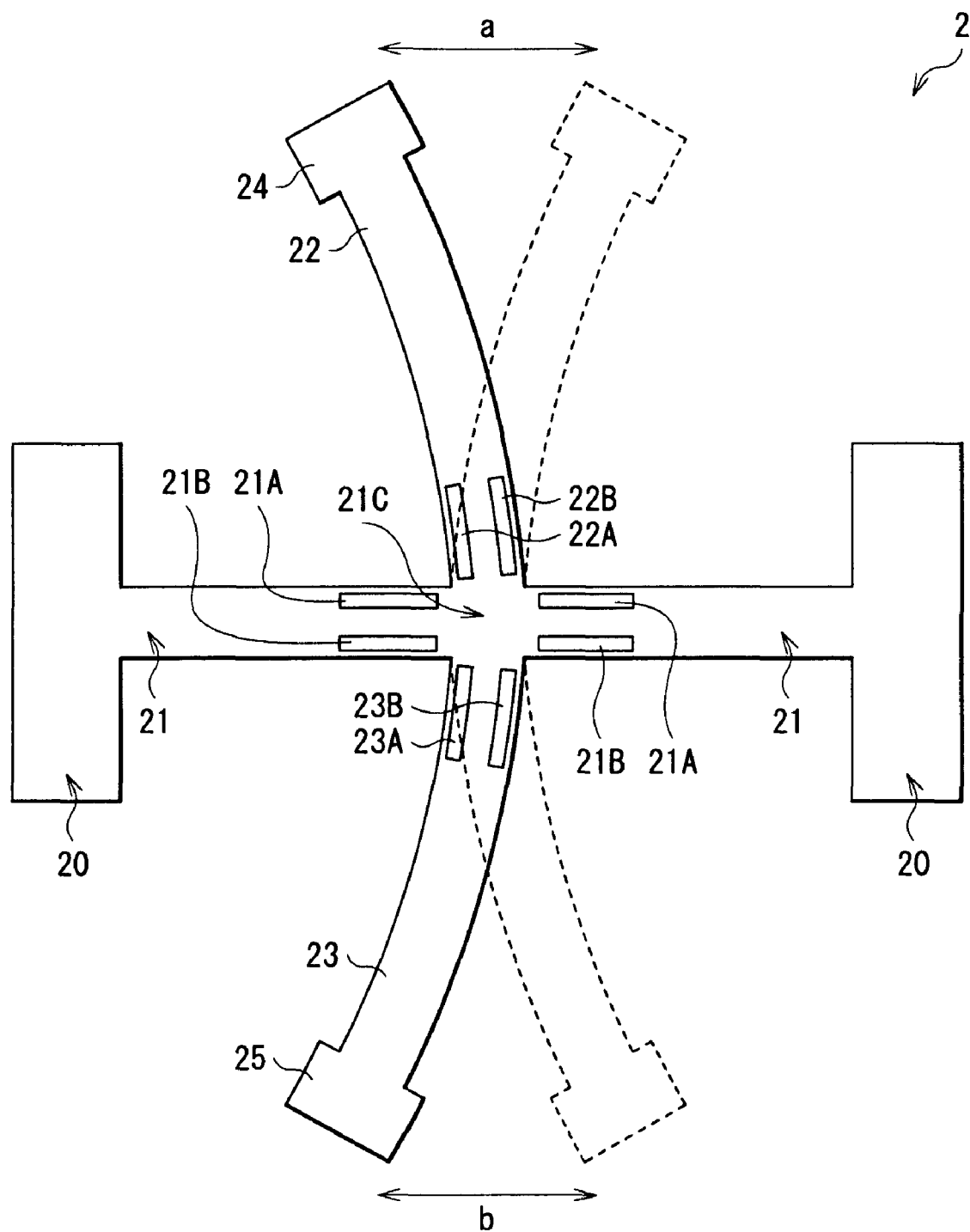
FIG. 6 is a top configuration view explaining operation when no rotation is applied to the angular velocity sensor of FIG. 1.

In the angular velocity sensing device 1 having such a configuration, in the case that an object equipped with the angular velocity sensing device 1 performs no rotation, for example, when the pair of upper drive arm 22 and the lower drive arm 23 are driven in the same phase using the piezoelectric elements 22A, 22B, 23A, and 23B, as shown in FIG. 6, the upper drive arm 22 mainly vibrates in a direction "a" intersecting the extending direction of the upper drive arm 22, and the lower drive arm 23 mainly vibrates in a direction "b" intersecting the extending direction of the lower drive arm 23.

Figure 7:
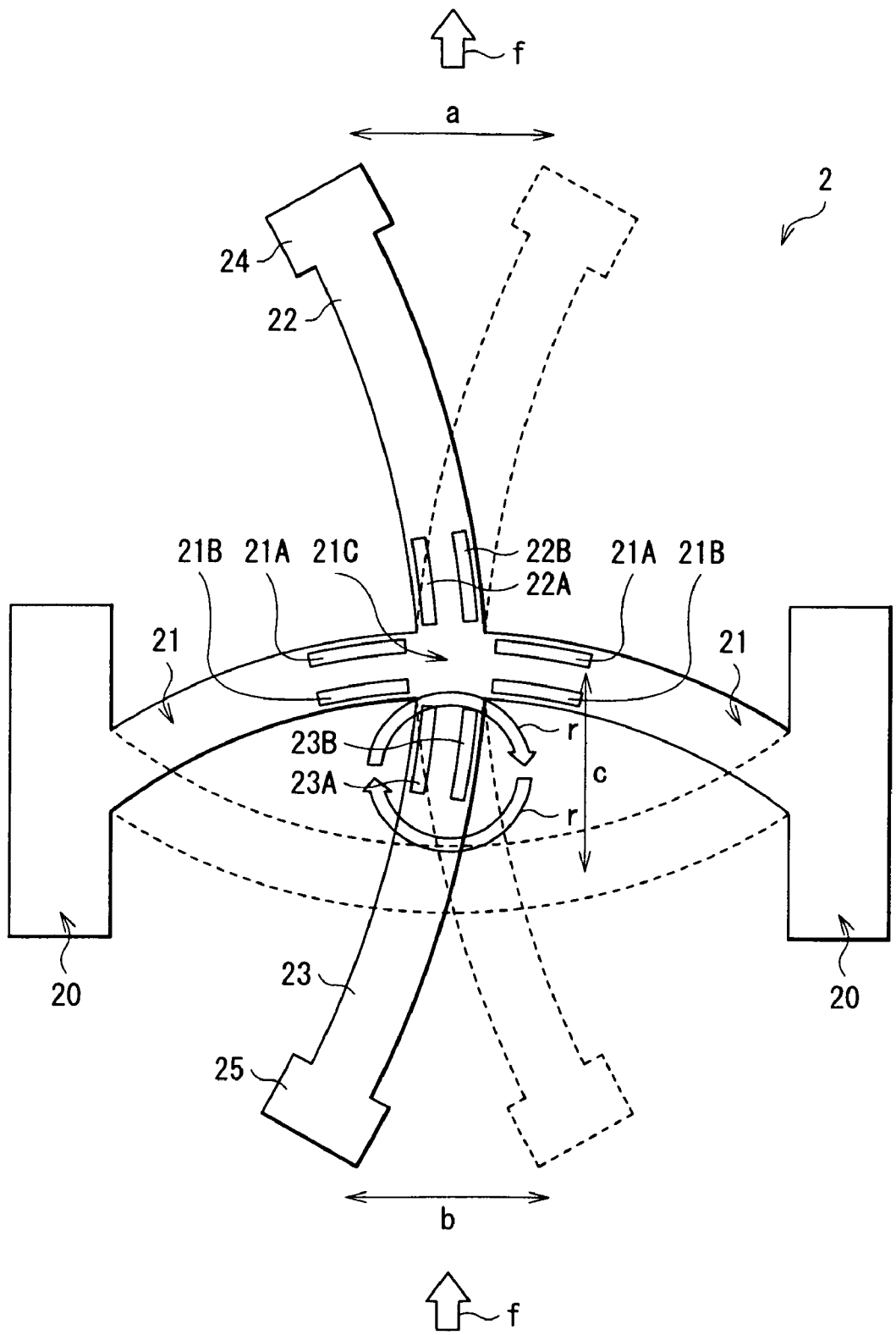
FIG. 7 is a top configuration view explaining the operation when the rotation is applied to the angular velocity sensor of FIG. 1.

Here, for example as shown in FIG. 7, when the object equipped with the angular velocity sensing device 1 performs a rotation "r" with respect to the direction orthogonal to the plane including the sensor support section 42, a Coriolis force "f" acts on the pair of upper drive arm 22 and lower drive arm 23 in the same direction, respectively, and the detection arm 21 vibrates in a direction "c" intersecting the extending direction of the detection arm 21. Thus, the angular velocity can be detected by taking a detection signal according to the vibrations of the detection arm 21 at the time, from the piezoelectric elements 21A and 21B.

In the first embodiment, because the detection arm 21 and the upper drive arm 22 and lower drive arm 23 are coupled without the fixed section 20 in between, respectively, the distortion generated by the Coriolis force acting on the pair of upper drive arm 22 and lower drive arm 23 can be directly transmitted to the detection arm 21 without the fixed section 20 in between. Thus, the distortion generated by the Coriolis force can be efficiently transmitted to the detection arm 21 without complicating the configuration of the fixed section 20; thereby the fixed section 20 can be easily fixed on the sensor support section 42.

Figure 8:
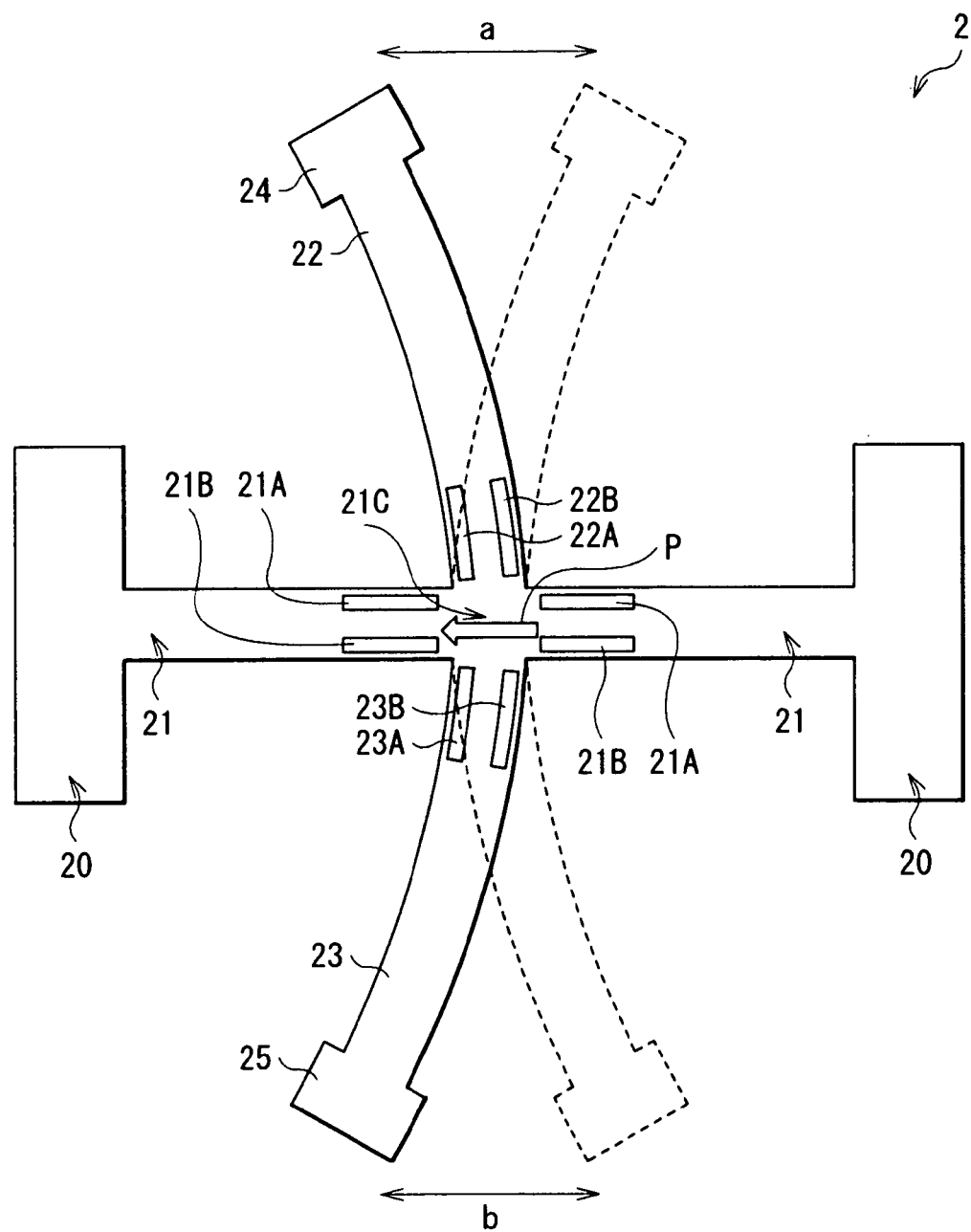
FIG. 8 is a top configuration view explaining the operation when acceleration in a lateral direction is applied to the angular velocity sensor of FIG. 1.

The pair of upper drive arm 22 and lower drive arm 23 are coupled to the detection arm 21, and extend in the direction opposite to each other so as to intersect the extending direction of the detection arm 21. Thus, it can be said that the detection arm 21 is formed of a pair of detection arms extending in the directions opposite to each other with respect to the upper drive arm 22 and the lower drive arm 23. Therefore, in the case that the angular velocity is detected in the above way, or in the case that the object equipped with the angular velocity sensing device 1 stops or performs the uniform motion, when the detection arm 21 receives an acceleration "p" in the lateral direction, the detection arm 21 is hardly displaced by the acceleration "p". FIG. 8 shows an example of the motion of the angular velocity sensor 2 receiving the acceleration "p" in the lateral direction when the object equipped with the angular velocity sensing device 1 stops or performs the uniform motion. Accordingly, although the angular velocity sensor 2 is horizontally located, the vibrations generated due to the Coriolis force and the vibrations generated by the acceleration in the lateral direction can be distinguished; thereby the influence of the acceleration in the lateral direction can be almost eliminated.

Respective ends of the upper drive arm 22 and the lower drive arm 23 on opposite sides from the coupling ends of the upper drive arm 22 and the lower drive arm 23, and the detection arm 21 are free ends. Thus, the detection arm 21 and the pair of upper drive arm 22 and lower drive arm 23 are likely vibrated in comparison with the case where all ends of the detection arm 21, and the pair of upper drive arm 22 and lower drive arm 23 are fixed; thereby the sensitivity of the sensor can be enhanced.

In FIG. 3, although one end of the upper drive arm 22 is coupled to the weighting section 24 and one end of the lower drive arm 23 is coupled to the weighting section 25, the weighting sections 24 ad 25 are not fixed to the fixed section 20. Thus, it can be said that one end of the upper drive arm 22 and one end of the lower drive arm 23 are free ends.

Here, in the first embodiment, in the case that the pair of upper drive arm 22 and lower drive arm 23 are driven in the same phase using the piezoelectric elements 22A, 22B, 23A, and 23B, when the upper drive arm 22 and the lower drive arm 23 are coupled to the middle point 21C in the extending direction of the detection arm 21, it means that the upper drive arm 22 and the lower drive arm 23 are coupled to the anti-node of the vibrations (standing waves) generated in the detection arm 21 due to the Coriolis force. This enables the efficient transmission of the distortion generated by the Coriolis force to the detection arm 21 so that the amplitude of the detection arm 21 is increased. As a result, the sensitivity of the element can be enhanced.

In the case that the upper drive arm 22 and the lower drive arm 23 are formed so as to extend line-symmetrically with respect to the detection arm 21, the vibrations due to the acceleration in the lateral direction and the vibrations due to the angular velocity can be easily distinguished; thereby the detection accuracy of the angular velocity is improved.

In the case that the upper drive arm 22 and the lower drive arm 23 are coupled to the common portion (for example, the middle point 21C) of the detection arm 21, and are formed so as to extend passing through the common portion and orthogonal to the detection arm 21, the right-left symmetric drive vibrations are likely generated so that a drive circuit driving the upper drive arm 22 and the lower drive arm 23 can be simplified and the unnecessary vibrations of the detection arm 21 can be suppressed.

In the case that one end of the upper drive arm 22 is coupled to the weighting section 24, and one end of the lower drive arm 23 is coupled to the weighting section 25, when the upper drive arm 22 and the lower drive arm 23 are vibrated, the upper drive arm 22 and the lower drive arm 23 can be vibrated with relatively large amplitude; thereby the detection accuracy of the angular velocity is improved.

Second Embodiment

Next, an angular velocity sensing device 6 according to a second embodiment of the present invention will be described.

Figure 9:
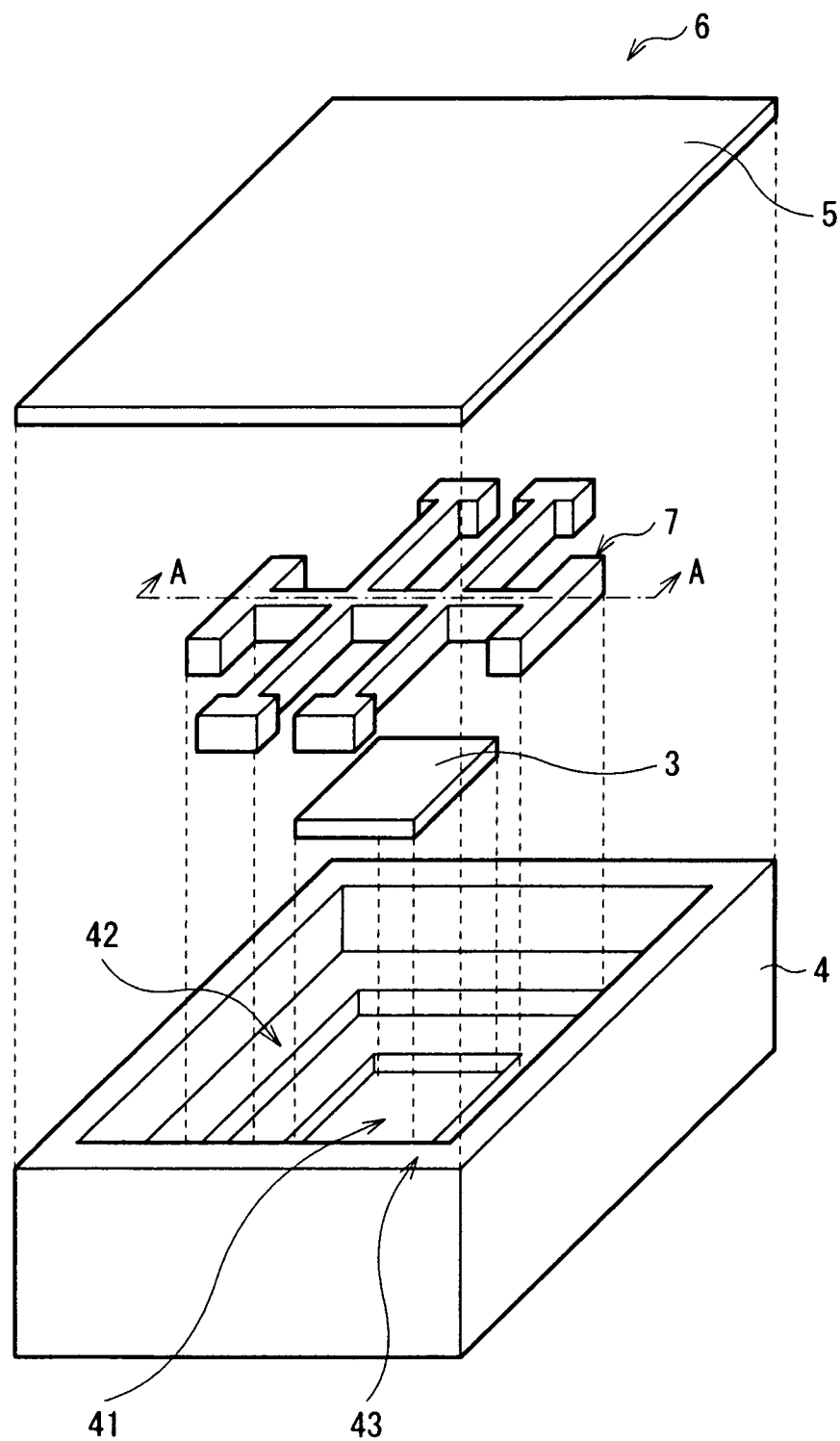
FIG. 9 is an exploded perspective view of the angular velocity sensing device according to a second embodiment of the present invention.
Figure 10:
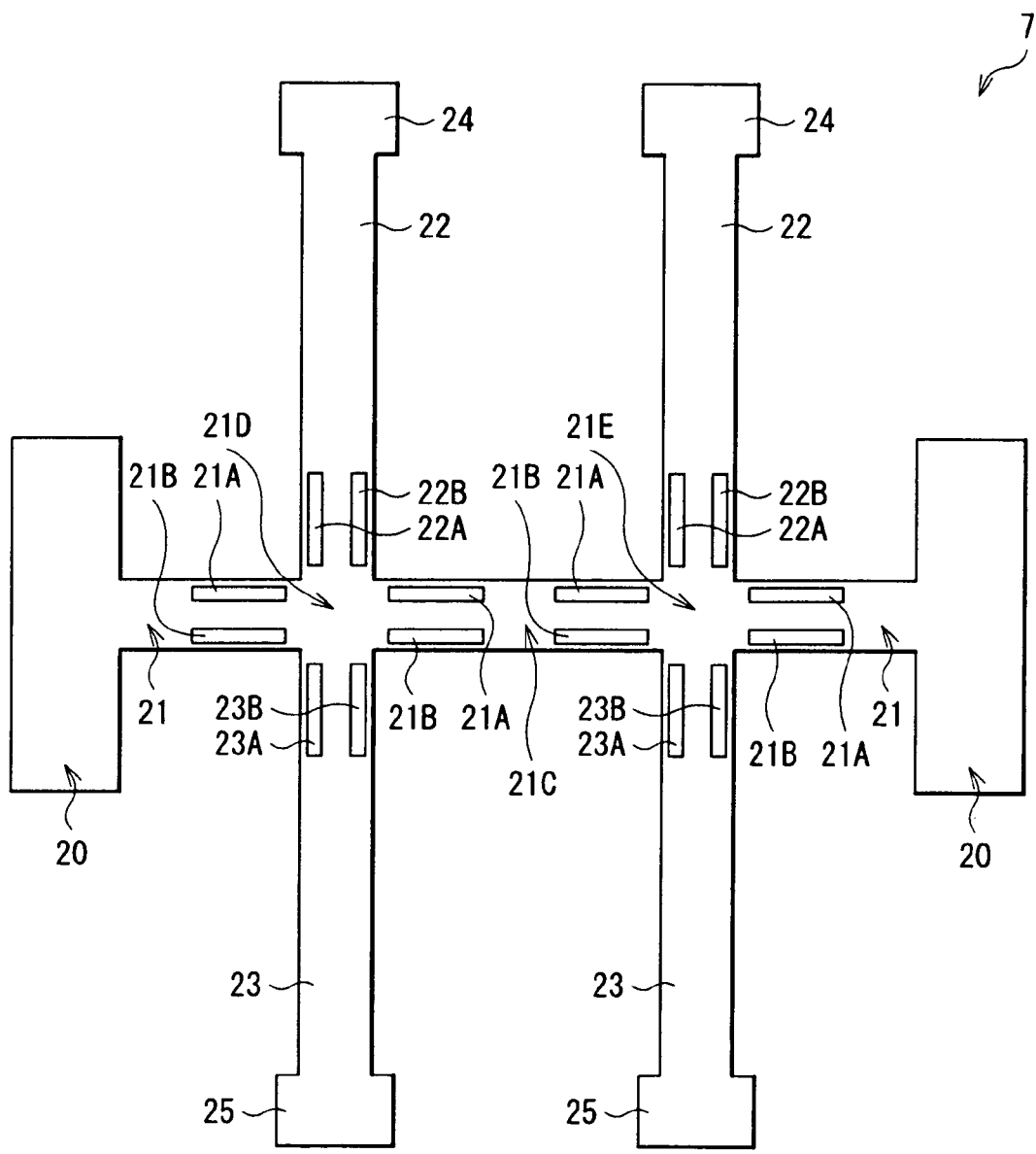
FIG. 10 is a top configuration view of an angular velocity sensor of FIG. 9.

In the first embodiment, a pair of upper drive arm 22 and lower drive arm 23 are directly coupled to a detection arm 21 without a fixed section 20 in between. However, in an angular velocity sensor 7 of the second embodiment, as shown in FIGS. 9 and 10, two pairs of upper drive arms 22 and lower drive arms 23 are directly coupled to the detection arm 21 without the fixed section 20 in between. On this point, the configuration of the angular velocity sensor 7 in the second embodiment is mainly different from the configuration of an angular velocity sensor 2 in the first embodiment. Therefore, the difference between the first embodiment and the second embodiment will be mainly described in the following, and the points common to the first embodiment will be appropriately omitted.

As described above, in the second embodiment, the two pairs of upper drive arms 22 and lower drive arms 23 are coupled to the detection arm 21. Here, when a length of an extending direction of the detection arm 21 is divided into quarters, one of the two pairs of upper drive arms 22 and lower drive arms 23 is preferably coupled to the detection arm 21 in a position one-fourths (a quarter divided portion 21D) from one of the pair of fixed sections 20 (for example, the fixed section 20 on the left side in FIG. 10). Further, the other of the two pairs of upper drive arms 22 and lower drive arms 23 is preferably coupled to the detection arm 21 in the position three-fourths (a quarter divided portion 21E) from the other of the pair of fixed sections 20 (for example, the fixed section 20 on the left side in FIG. 10). However, the two pairs of upper drive arms 22 and lower drive arms 23 may be coupled to portions other than the portions described above.

Each of the upper drive arms 22 and each of the lower drive arms 23 are preferably extend line-symmetrically (up-down symmetrically) with respect to the detection arm 21; however may asymmetrically extend (up-down asymmetrically). Also, one of the two pairs of upper drive arms 22 and lower drive arms 23 is preferably coupled to the common portion (the quarter divided portion 21D in FIG. 10) of the detection arm 21, and are preferably formed extending on a straight line passing through the common portion and orthogonal to the detection arm 21; however may be coupled to the positions slightly different to each other. Similarly, the other of the two pairs of upper drive arms 22 and lower drive arms 23 is preferably coupled to the common portion (the quarter divided portion 21E in FIG. 10) of the detection arm 21, and preferably formed extending on a straight line passing through the common portion and orthogonal to the detection arm 21; however may be coupled to the positions slightly different to each other.

On the surface of the detection arm 21, four pairs of piezoelectric elements 21A and 21B extending in a direction parallel to the extending direction of the detection arm 21 are formed. When the detection arm 21 vibrates along a plane parallel to the plane including a sensor support section 42 of a case 4, the pair of piezoelectric elements 21A and 21B detect the vibrations, and are preferably arranged in the direction intersecting the extending direction of the detection arm 21. The piezoelectric elements 21A and 21B are preferably arranged in the position where the detection arm 21 is most largely distorted. For example, as shown in FIG. 10, the piezoelectric elements 21A and 21B are preferably formed in the positions sandwiching one of the coupling points (the quarter divided portion 21D); and also are preferably formed in the positions sandwiching the other of the coupling points (the quarter divided portion 21E).

Figure 11:
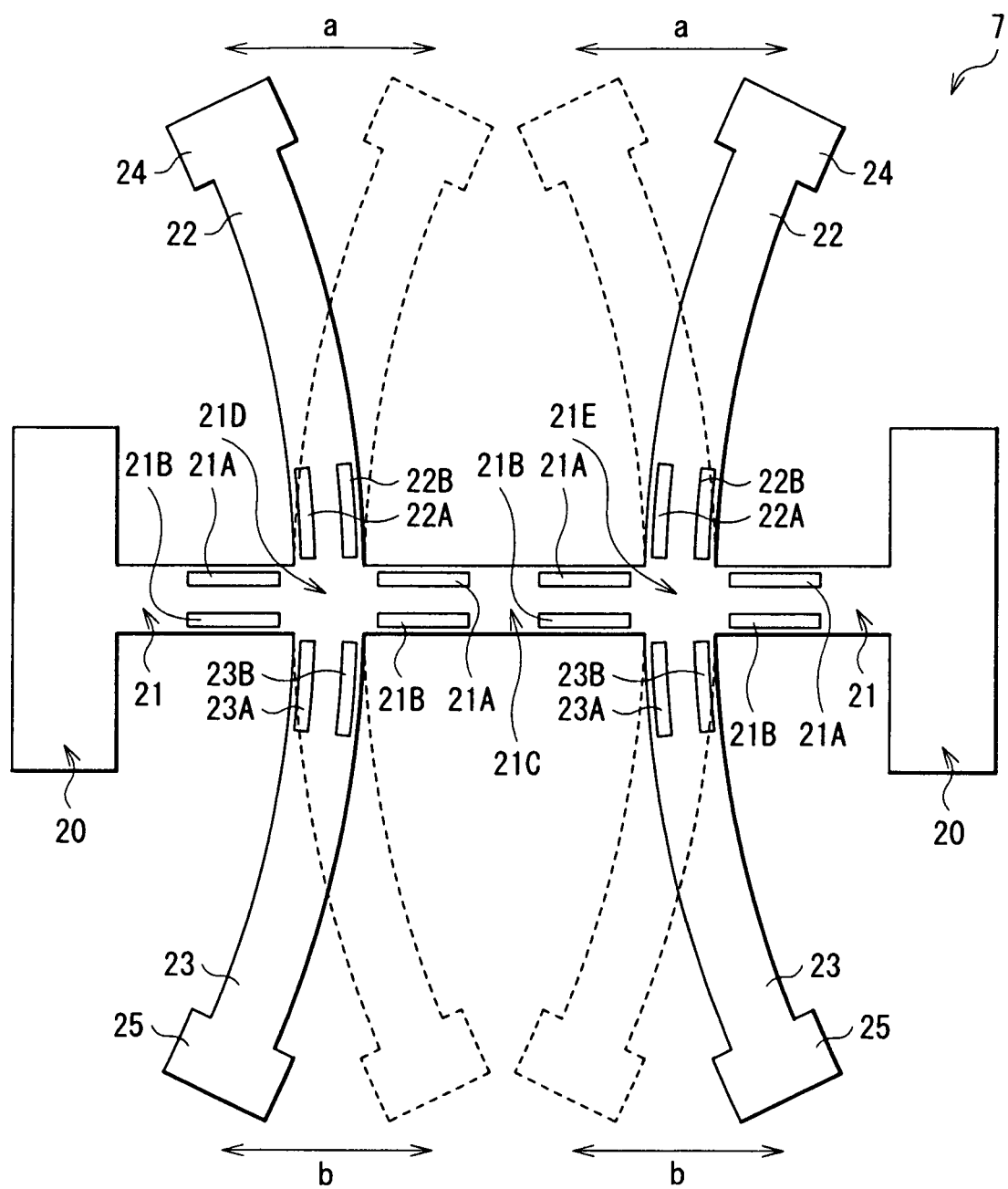
FIG. 11 is a top configuration view explaining the operation when no rotation is applied to the angular velocity sensor of FIG. 9.

In the angular velocity sensing device 6 having such a configuration, in the case that an object equipped with the angular velocity sensing device 6 performs no rotation, for example, using the piezoelectric elements 22A, 22B, 23A, and 23B, one of the two pairs of upper drive arms 22 and lower drive arms 23 are driven in the same phase to each other and the other of the two pairs of upper drive arms 22 and lower drive arms 23 are driven in the same phase to each other, and further one of the two pairs of upper drive arms 22 and lower drive arms 23 are vibrated in the phase opposite to the other of the two pairs of upper drive arms 22 and lower drive arms 23. In this case, for example as shown in FIG. 11, two upper drive arms 22 mainly vibrate in a direction "a" intersecting the extending direction of the upper drive arms 22 in the phase opposite to each other, and two lower drive arms 23 mainly vibrate in a direction "b" intersecting the extending direction of the lower drive arms 23 in the phase opposite to each other. Also, two upper drive arms 22 and two of the lower drive arms 23 are line-symmetrically vibrated with respect to the detection arm 21.

Figure 12:
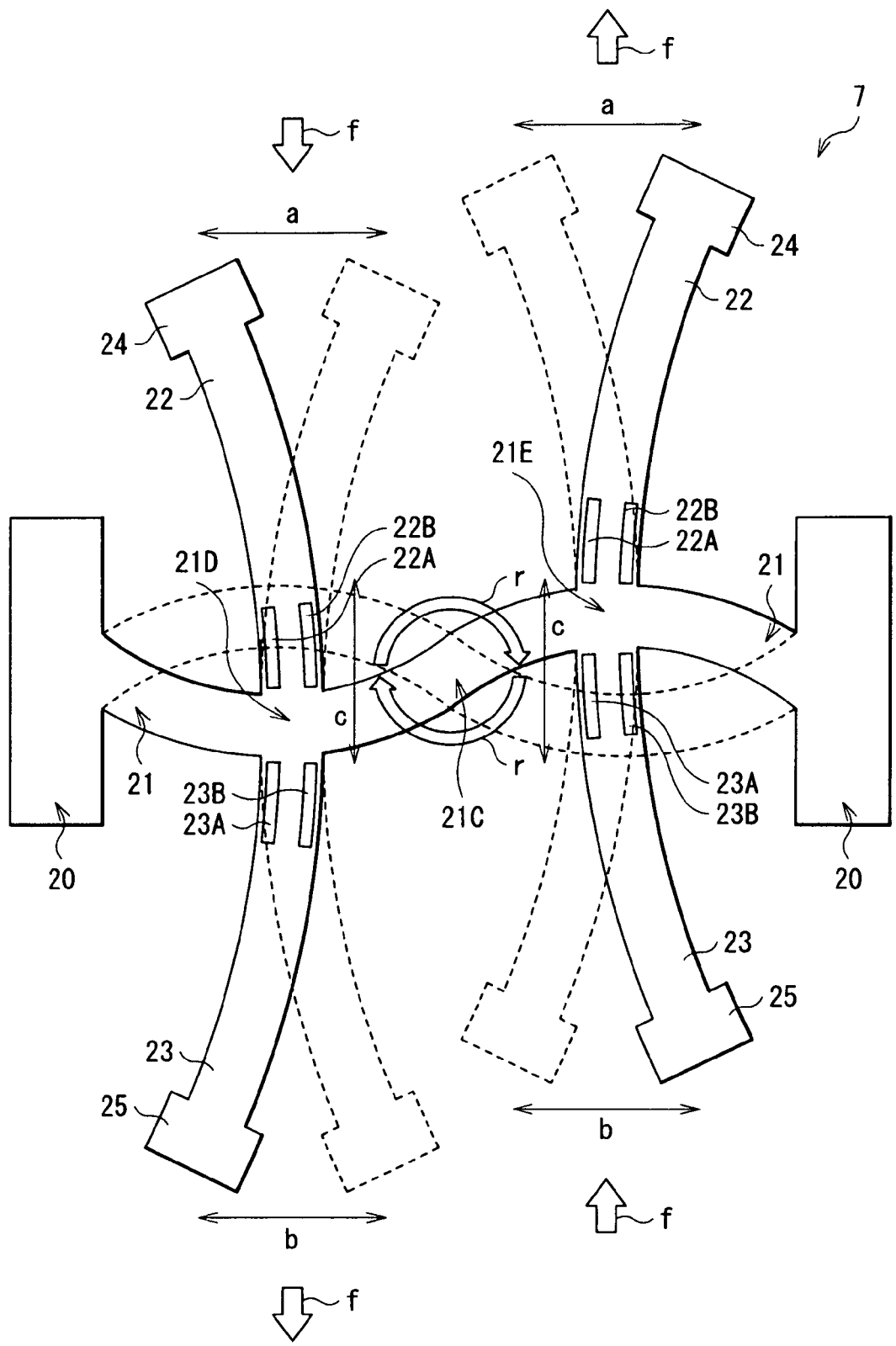
FIG. 12 is a top configuration view explaining the operation when the rotation is applied to the angular velocity sensor of FIG. 9.

Here, for example as shown in FIG. 12, when the object equipped with the angular velocity sensing device 6 performs a rotation "r" with respect to the direction orthogonal to the plane including the sensor support section 42, a Coriolis force "f" acts on two of the upper drive arms 22 in the direction opposite to each other, and on two of the lower drive arms 23 in the direction opposite to each other. Also, the detection arm 21 vibrates with the middle point 21C as a node and with the quarter divided portions 21D and 21E as anti-nodes, and the quarter divided portions 21D and 21E vibrate in a direction "c" intersecting the extending direction of the detection arm 21. Thus, the angular velocity can be detected by taking a detection signal according to the vibrations of the detection arm 21 at the time, from the piezoelectric elements 21A and 21B.

In the second embodiment, because the detection arm 21 and the two pairs of upper drive arms 22 and lower drive arms 23 are coupled without the fixed section 20 in between, respectively, the distortion generated by the Coriolis force acting on each of the two pairs of upper drive arms 22 and lower drive arms 23 can be directly transmitted to the detection arm 21 without the fixed section 20 in between. Thus, the distortion generated by the Coriolis force can be efficiently transmitted to the detection arm 21 without complicating the configuration of the fixed sections 20. Therefore the fixed sections 20 can be easily fixed on the sensor support section 42.

Figure 13:
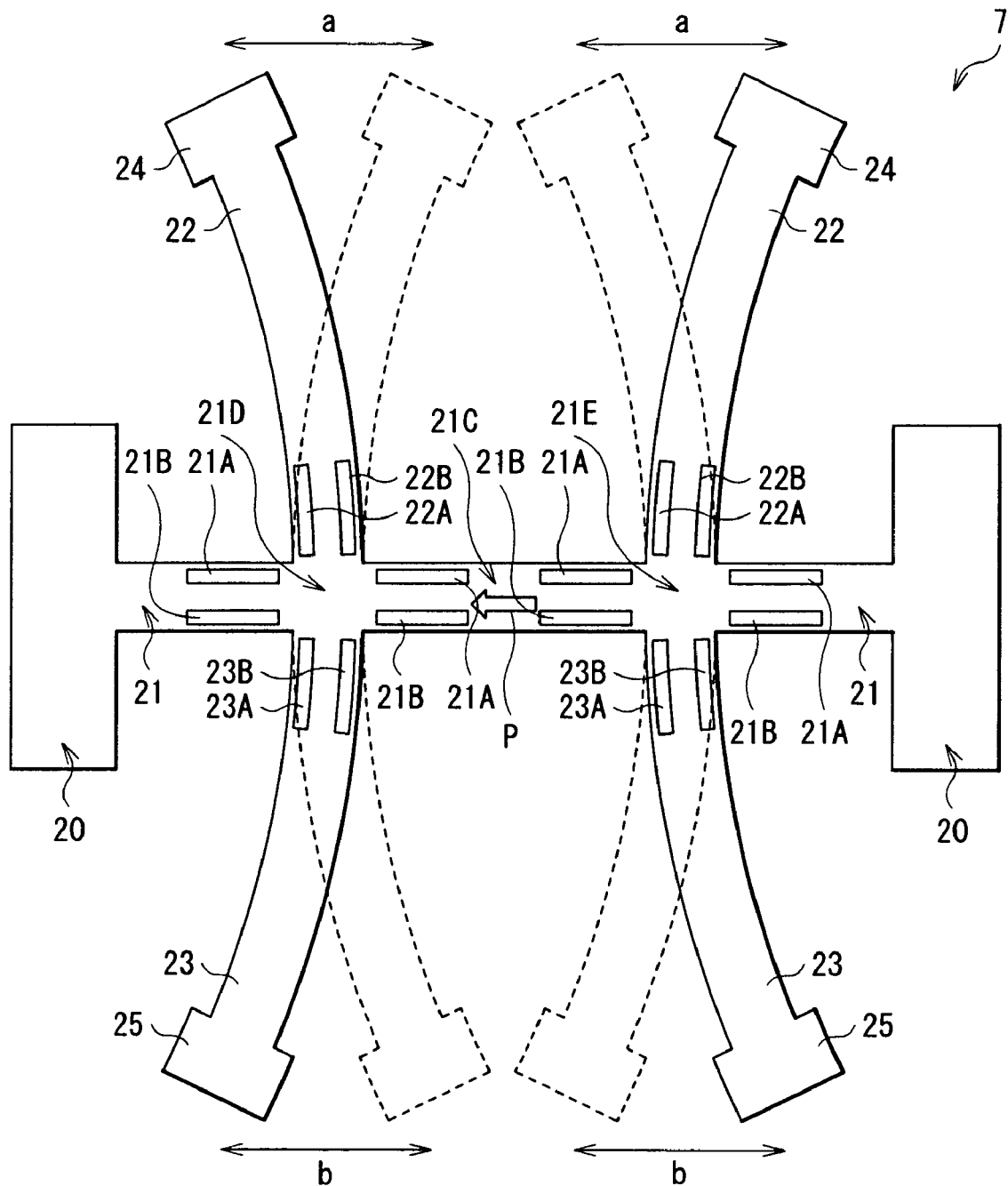
FIG. 13 is a top configuration view explaining the operation when acceleration in the lateral direction is applied to the angular velocity sensor of FIG. 9.

The two pairs of upper drive arms 22 and lower drive arms 23 are coupled to the detection arm 21, and extend in the direction opposite to each other so as to intersect the extending direction of the detection arm 21. Thus, it can be said that the detection arm 21 is formed of two parts extending in the direction opposite to each other with respect to the pair of upper drive arm 22 and lower drive arm 23. Therefore, in the case that the angular velocity is detected in the above way, or in the case that the object equipped with the angular velocity sensing device 6 stops or performs the uniform motion, when the detection arm 21 receives an acceleration "p" in the lateral direction, the detection arm 21 is hardly displaced by the acceleration "p". FIG. 13 shows an example of the motion of the angular velocity sensor 7 receiving the acceleration "p" in the lateral direction when the object equipped with the angular velocity sensing device 6 stops or performs the uniform motion. Accordingly, although the angular velocity sensor 7 is horizontally located, the vibrations generated due to the Coriolis force and the vibrations generated by the acceleration in the lateral direction can be distinguished; thereby the influence of the acceleration in the lateral direction can be almost eliminated.

Respective ends of the upper drive arms 22 and the lower drive arms 23 on opposite sides from the coupling ends of the upper drive arms 22 and the lower drive arms 23, and the detection arm 21 are free ends. Thus, the detection arm 21, and the pair of upper drive arm 22 and lower drive arm 23 are likely vibrated in comparison with the case where all ends of the detection arm 21, and the pair of upper drive arm 22 and lower drive arm 23 are fixed; thereby the sensitivity of the sensor can be enhanced.

Here, in the second embodiment, in the condition that one of the two pairs of upper drive arms 22 and lower drive arms 23 are coupled to the quarter divided portion 21D in the extending direction of the detection arm 21, and the other of the two pairs of upper drive arms 22 and lower drive arms 23 are coupled to the quarter divided portion 21E in the extending direction of the detection arm 21, using the piezoelectric elements 22A, 22B, 23A, and 23B, one of the two pairs of upper drive arms 22 and lower drive arms 23 are driven in the same phase to each other and the other of the two pairs of upper drive arms 22 and lower drive arms 23 are driven in the same phase to each other, and one of the two pairs of upper drive arms 22 and lower drive arms 23 are driven in the phase opposite to the other of the two pairs of upper drive arms 22 and lower drive arms 23. In this case, it means that each of the two pairs of upper drive arms 22 and lower drive arms 23 are coupled to the anti-nodes of the vibrations (standing waves) generated in the detection arm 21 due to the Coriolis force. Thus, the distortion generated by the Coriolis force is efficiently transmitted to the detection arm 21; thereby the amplitude of the detection arm 21 is increased. As a result, the sensitivity of the element can be enhanced.

In the case that each of the two pairs of upper drive arms 22 and lower drive arms 23 are formed so as to extend line-symmetrically with respect to the detection arm 21, the vibrations due to the acceleration in the lateral direction and the vibrations due to the angular velocity can be easily distinguished; thereby the detection accuracy of the angular velocity is improved.

In the case that one of the two pairs of upper drive arms 22 and lower drive arms 23 are coupled to the common portion (for example, the quarter divided portion 21D) of the detection arm 21 and the other of the two pairs of upper drive arms 22 and lower drive arms 23 are coupled to the common portion (for example, the quarter divided portion 21E) of the detection arm 21, and both of the two pairs of upper drive arms 22 and lower drive arms 23 are formed extending on straight lines passing through the respective common portions and orthogonal to the detection arm 21, the right-left symmetric drive vibrations are likely generated so that a drive circuit driving each of the two pairs of upper drive arms 22 and lower drive arms 23 can be simplified, and the unnecessary vibrations of the detection arm 21 can be suppressed.

In the case that one end of each of the upper drive arms 22 is coupled to the weighting section 24, and one end of each of the lower drive arms 23 is coupled to the weighting section 25, when each of the two pairs of upper drive arms 22 and lower drive arms 23 are vibrated, the upper drive arm 22 and the lower drive arm 23 can be vibrated with relatively large amplitude; thereby the detection accuracy of the angular velocity is improved.

Modification of Second Embodiment

In the second embodiment, a middle point 21C of a detection arm 21 is not coupled to a fixed section 20, and thus can be displaced relatively freely. However, as shown in FIGS. 11 and 12, in the condition that one of two pairs of upper drive arms 22 and lower drive arms 23 are coupled to a quarter divided portion 21D in an extending direction of the detection arm 21 and the other of the two pairs of upper drive arms 22 and lower drive arms 23 are coupled to a quarter divided portion 21E in the extending direction of the detection arm 21, using piezoelectric elements 22A, 22B, 23A, and 23B, one of the two pairs of upper drive arms 22 and lower drive arms 23 are driven in the same phase to each other and the other of the two pairs of upper drive arms 22 and lower drive arms 23 are driven in the same phase to each other, and further one of the two pairs of upper drive arms 22 and lower drive arms 23 are vibrated in the phase opposite to the other of the two pairs of upper drive arms 22 and lower drive arms 23. In this case, ideally, the middle point 21C of the detection arm 21 is a node, and hardly moves.

Figure 14:
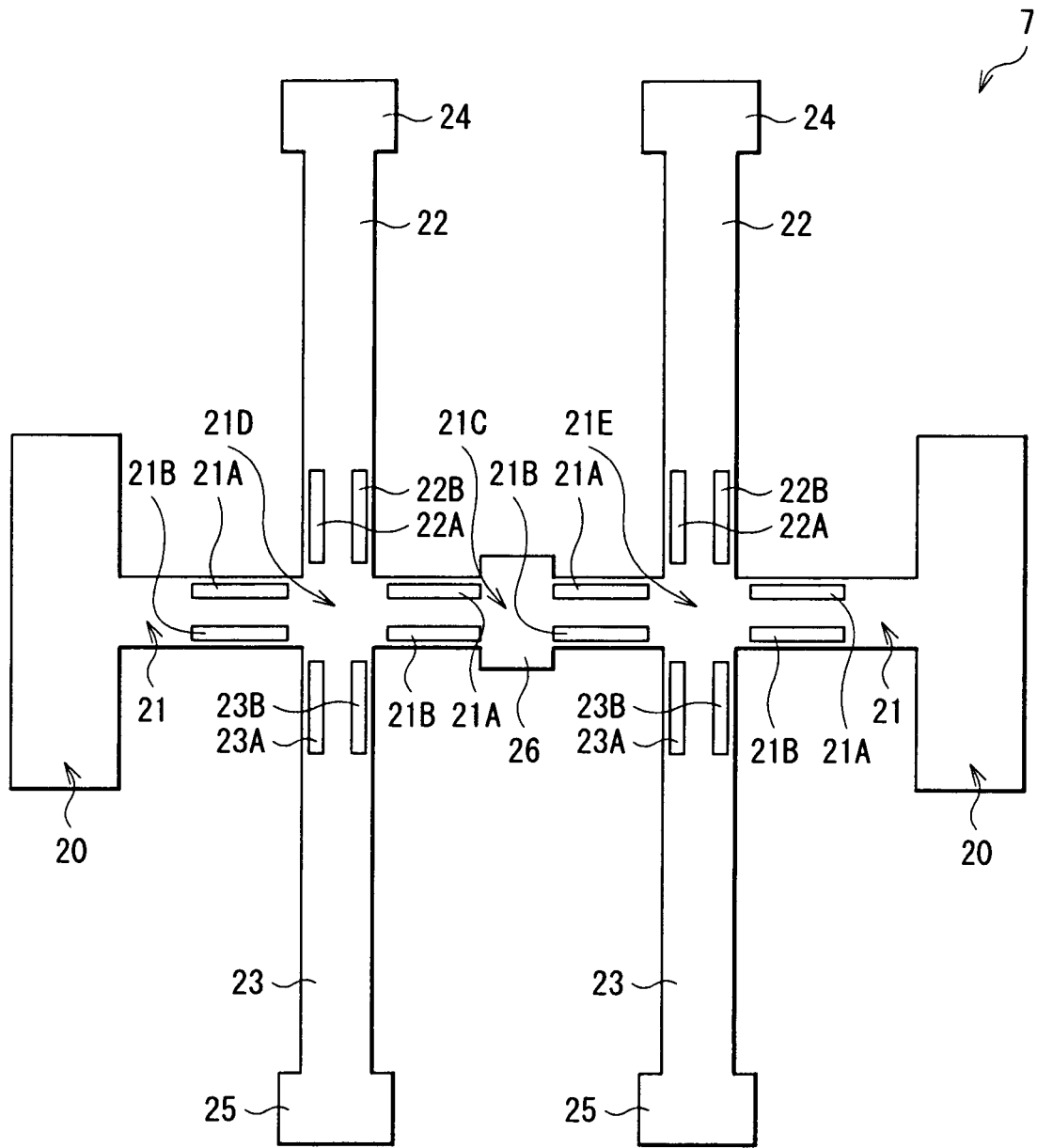
FIG. 14 is a top configuration view of the angular velocity sensor according to a modification of FIG. 13.
Figure 15:
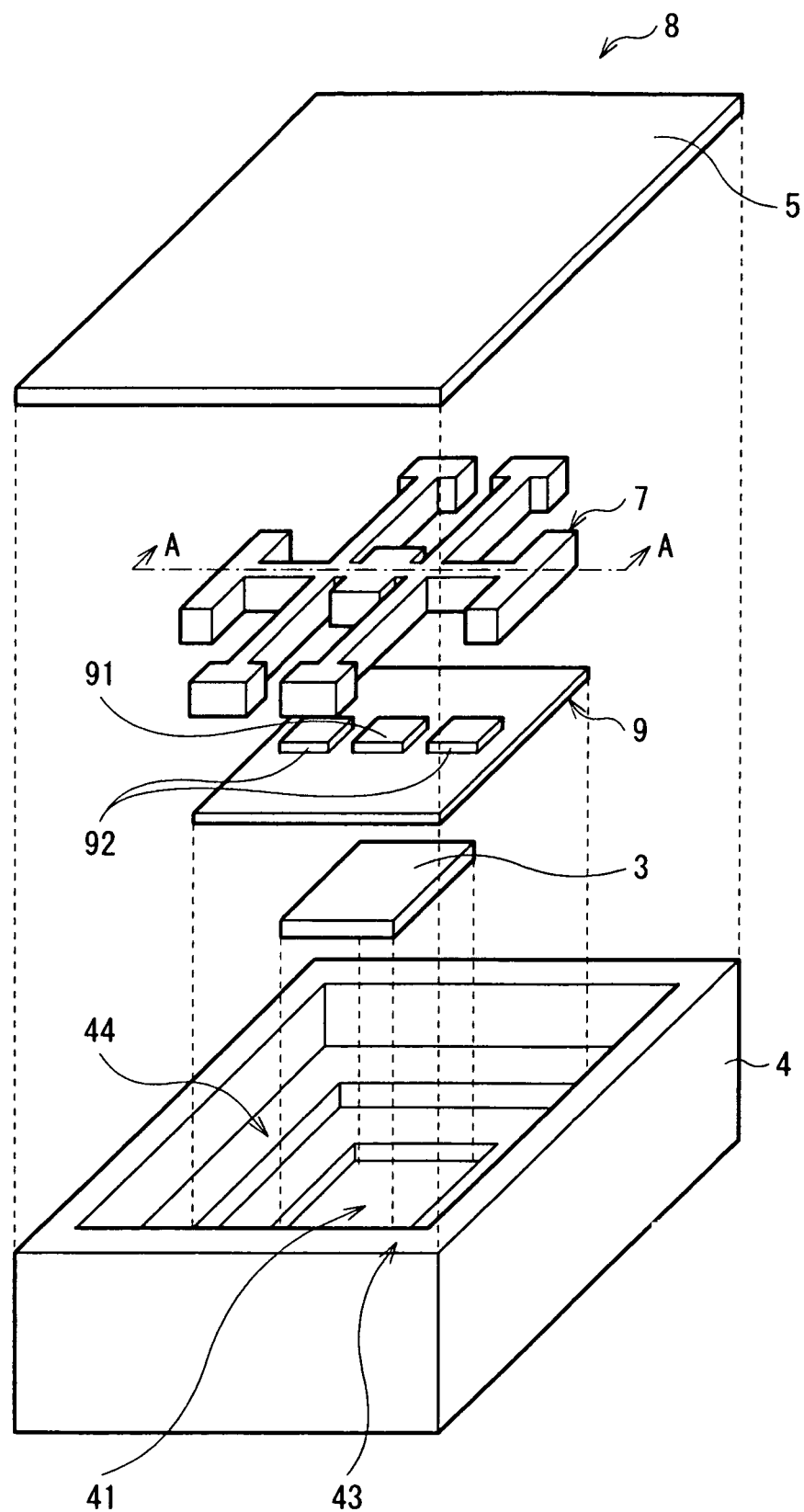
FIG. 15 is an exploded perspective view of the angular velocity sensing device provided with the angular velocity sensor of FIG. 14.
Figure 16:
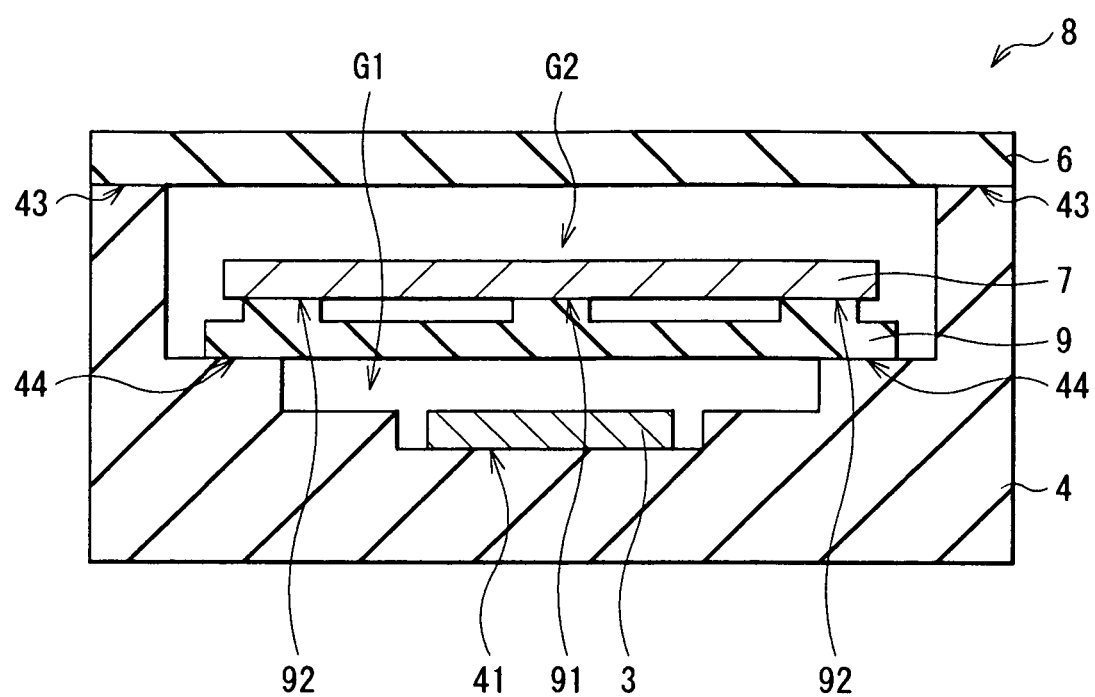
FIG. 16 is a cross-sectional configuration view as viewed from arrow A-A of FIG. 15.

However, in the second embodiment, the middle point 21C of the detection arm 21 is not fixed so that there is a risk that noise is accidentally superimposed in the detection arm 21. Thus, as shown in FIG. 14, an angular velocity sensing device 8 including a fixed portion 26 located in the middle point 21C of the detection arm 21 may be newly provided. Further, as shown in FIGS. 15 and 16, the angular velocity sensing device 8 may be provided with an inner lid section 9 having a sensor support section 91 in the center, and a pair of sensor support sections 92 on both outer sides of the sensor support section 91. Then, a bottom of each of the fixed sections 20 may be fixed on a top of the sensor section 92 and a bottom of the fixed section 26 may be fixed on the top of the sensor support section 91. Thus, the detection arm 21 is fixed in the central section 21C; thereby there is no risk that the noise is superimposed in the detection arm 21.

Hereinbefore, the present invention is explained with the embodiments and the modification. However, the present invention is not limited to these embodiments and modification, and can be variously modified.

It should be understood by those skilled in the art that various modifications, combinations, sub-combinations and alterations may occur depending on design requirements and other factors insofar as they are within the scope of the appended claims or the equivalents thereof.

What is claimed is:
1. An angular velocity sensor comprising:
a pair of first fixed sections fixed on a first support surface;
a first vibration arm extending along a plane parallel to the first support surface, one end of the first vibration arm coupled to one of the pair of first fixed sections and the other end of the first vibration arm coupled to the other of the pair of first fixed sections;

a pair of second vibration arms extending along the plane parallel to the first support surface and extending in a direction opposite to each other so as to intersect an extending direction of the first vibration arm, one end of each of the second vibration arms coupled to the first vibration arm and the other end of each of the second vibration arms formed as a free end.

2. The angular velocity sensor according to claim 1, wherein the one end of each of the second vibration arms is coupled to middle point of the extending length of the first vibration arm.

3. The angular velocity sensor according to claim 1, wherein the second vibration arms are arranged so as to extend symmetrically with respect to the first vibration arm.

4. The angular velocity sensor according to claim 1, wherein each of the second vibration arms, whose one end is coupled to a common portion of the first vibration arm, extends on a straight line which passes through the common portion and extends orthogonal to the first vibration arm.

5. The angular velocity sensor according to claim 1, wherein the other end of each of the second vibration arms is coupled to a weighting section.

6. The angular velocity sensor according to claim 1 further comprising:
two pairs of first electrodes formed on the first vibration arm at positions adjacent to a coupling point with the coupling point in between, the coupling point being a node where the second vibration arms are coupled to the first vibration arm, and each pair of the first electrodes being arranged in a width direction orthogonal to the extending direction of the first vibration arm; and
a pair of second electrodes formed on each of the second vibration arms, and arranged in a width direction orthogonal to the extending direction of the second vibration arms.

7. The angular velocity sensor according to claim 1 further comprising:
a pair of third vibration arms extending along the plane parallel to the first support surface and extending in the direction opposite to each other so as to intersect the extending direction of the first vibration arm, one end of each of the third vibration arms coupled to the first vibration arm and the other end of each of the third vibration arms formed as a free end.

8. The angular velocity sensor according to claim 7, wherein when a length in the extending direction of the first vibration arm is divided into quarters, each of the second vibration arms is coupled to the first vibration in the position one-fourths from one of the pair of fixed sections, and each of the third vibration arms is coupled to the first vibration arm in the position three-fourths from the one of the pair of fixed sections.

9. The angular velocity sensor according to claim 7, wherein the second vibration arms and the third vibration arms are arranged so as to extend symmetrically with respect to the first vibration arm, respectively.

10. The angular velocity sensor according to claim 7, wherein each of the second vibration arms, whose one end is coupled to a common portion of the first vibration arm, extends on a straight line which passes through the common portion and extends orthogonal to the first vibration arm, and
each of the third vibration arms, whose one end is coupled to a common portion of the first vibration arm, extends on a straight line which passes through the common portion and extends orthogonal to the first vibration arm.

11. The angular velocity sensor according to claim 7, wherein the other end of each of the second vibration arms is coupled to a weighting section, and
the other end of each of the third vibration arms is coupled to a weighting section.

12. The angular velocity sensor according to claim 7 comprising:
two pairs of first electrodes formed on the first vibration arm at positions adjacent to a coupling point with the coupling point in between, the coupling point being a node where the second vibration arms are coupled to the first vibration arm, and each pair of the first electrodes being arranged in a width direction orthogonal to the extending direction of the first vibration arm; and
a pair of second electrodes formed on each of the second vibration arms, and arranged in a width direction orthogonal to the extending direction of the second vibration arms;
two pairs of third electrodes formed on the first vibration arm at positions adjacent to a coupling point with the coupling point in between, the coupling point being a node where the third vibration arms are coupled to the first vibration arm, and each pair of the third electrodes being arranged in a width direction orthogonal to the extending direction of the first vibration arm; and
a pair of fourth electrodes formed on each of the third vibration arms, and arranged in a width direction orthogonal to the extending direction of the third vibration arms.

13. The angular velocity sensor according to claim 7 further comprising a second fixed section fixed on a second support surface,
wherein a middle point in the extending direction of the first vibration arm is coupled to the second fixed section.

14. An angular velocity sensing device comprising an angular velocity sensor and an integrated circuit,
wherein the angular velocity sensor includes:
a pair of first fixed sections fixed on a first support surface;
a first vibration arm extending along a plane parallel to the first support surface, one end of the first vibration arm coupled to one of the pair of first fixed sections and the other end of the first vibration arm coupled to the other of the pair of first fixed sections; and
a pair of second vibration arms extending along the plane parallel to the first support surface and extending in a direction opposite to each other so as to intersect an extending direction of the first vibration arm, one end of each of the second vibration arms coupled to the first vibration arm and the other end of each of the second vibration arms formed as a free end, and
the integrated circuit transmits a drive signal to vibrate the second vibration arms, and receives a detection signal outputted by the vibration of the first vibration arm.

15. The angular velocity sensing device according to claim 14 further comprising:
a pair of third vibration arms extending along the plane parallel to the first support surface and extending in the direction opposite to each other so as to intersect the extending direction of the first vibration arm, one end of each of the third vibration arms coupled to the first vibration arm and the other end of each of the third vibration arms formed as the free end,
wherein the integrated circuit transmits the drive signal to vibrate the third vibration arms.

* * * * *